United States Patent
Beard et al.

(10) Patent No.: US 10,626,863 B2
(45) Date of Patent: Apr. 21, 2020

(54) PUMP STATION MONITORING SYSTEM AND METHOD

(71) Applicant: Pulsar Process Measurement Limited, Worcester (GB)

(72) Inventors: Keith Victor Beard, Worcester (GB); Sang Tran, Oldbury (GB)

(73) Assignee: Pulsar Process Measurement Limited, Worcester (GB)

(*) Notice: Subject to any disclaimer, the term of this patent is extended or adjusted under 35 U.S.C. 154(b) by 310 days.

(21) Appl. No.: 15/550,991

(22) PCT Filed: Feb. 15, 2016

(86) PCT No.: PCT/GB2016/050363
§ 371 (c)(1),
(2) Date: Aug. 14, 2017

(87) PCT Pub. No.: WO2016/132107
PCT Pub. Date: Aug. 25, 2016

(65) Prior Publication Data
US 2018/0066651 A1    Mar. 8, 2018

(30) Foreign Application Priority Data
Feb. 16, 2015  (GB) .................................. 1502577.8

(51) Int. Cl.
*F04B 51/00*     (2006.01)
*E03F 5/22*      (2006.01)
(Continued)

(52) U.S. Cl.
CPC ................ *F04B 51/00* (2013.01); *E03F 5/22* (2013.01); *F04B 23/02* (2013.01); *F04B 23/021* (2013.01);
(Continued)

(58) Field of Classification Search
CPC ........ F04B 51/00; F04B 23/02; F04B 23/021; G05B 19/0428; G05B 23/0283; F04D 15/0088
See application file for complete search history.

(56) References Cited

U.S. PATENT DOCUMENTS 4,999,117 A        3/1991  Palmu et al.
2011/0077875 A1*   3/2011  Tran .......................... E03F 5/22
                                                        702/45
(Continued)

FOREIGN PATENT DOCUMENTS

EP     2297625 B1    7/2012
GB     2313197 A    11/1997

*Primary Examiner* — David Z Huang
(74) *Attorney, Agent, or Firm* — Fox Rothschild LLP

(57) ABSTRACT

A system comprising: a reservoir (14) for holding a liquid (1); a pump (20) arranged to pump the liquid (1) out of the reservoir (14) to a system outlet (24) or into the reservoir (14) from a system inlet; a pressure sensor (34) arranged between the reservoir (14) and the system outlet (24) or between the system inlet and the reservoir (14), the pressure sensor (34) configured to measure the discharge pressure (Pd) of the pump (20) and to generate discharge pressure data; a level sensor (26) configured to detect the level (1) of the liquid (1) in the reservoir (14) and to generate level data; a power monitor (28) configured to monitor the power consumed (p) by the pump (20) and to generate power data; a volume monitor configured to monitor the volume (V) of liquid (1) pumped by the pump (20) and to generate volume data; and a controller (30) configured to: receive the power data, the volume data, the discharge pressure data and the level data; process the discharge pressure data to determine a discharge head (Hd) of the pump (20); process the level data to determine a static head (Hs) of the pump (20); process the discharge head (Hd) and the static head (Hs) to determine a total dynamic head (TDH) of the pump (20); and
(Continued)

process the total dynamic head (TDH), the volume data and the power data to determine a normalised pumping station efficiency (nSPE).

20 Claims, 5 Drawing Sheets

(51) Int. Cl.
  *F04B 49/06*    (2006.01)
  *F04B 49/02*    (2006.01)
  *F04B 23/02*    (2006.01)
  *F04D 15/00*    (2006.01)
  *G05B 23/02*    (2006.01)
  *G05B 19/042*   (2006.01)

(52) U.S. Cl.
  CPC ............ *F04B 49/02* (2013.01); *F04B 49/065* (2013.01); *F04D 15/0088* (2013.01); *G05B 19/0428* (2013.01); *G05B 23/0283* (2013.01); *G05B 19/042* (2013.01); *G05B 2219/24015* (2013.01)

(56) References Cited

U.S. PATENT DOCUMENTS

| | | | |
|---|---|---|---|
| 2013/0204546 A1 | 8/2013 | Devine et al. | |
| 2013/0268213 A1* | 10/2013 | Gomez | F04D 7/00 702/33 |
| 2016/0076549 A1* | 3/2016 | Kelly | F04D 15/0066 700/282 |

* cited by examiner

PUMP STATION MONITORING SYSTEM AND METHOD

This invention relates to a system and method for monitoring the operation of one or more pumping stations, each pumping station having one or more pumps operating in it. This invention also relates to a method of comparing different pumping stations operating in different environments and thus prioritising pump station maintenance visits.

Although the present invention will be described herein with particular reference to the operation of electrically controlled pumps in a pumping station, it is not to be construed as being limited thereto.

A pumping station typically has a container for holding a liquid, such as a well, sump, holding tank or tank. In some pumping stations, there may be multiple wells or sumps. One or more pumps can be used to transfer liquids into or out of the container. For example, pumps may be used to transfer sewage out of sumps in sewage pumping stations, or to pump fresh water into holding tanks in clean water boost stations.

A typical liquid container has an inlet to admit liquid and an outlet through which the liquid is removed. Each liquid container has one or more pumps associated with the inlet or the outlet. The pumps, when activated, transfer the liquid, as required.

A single operator may have responsibility for many pumping stations, meaning the operator has responsibility for hundreds or thousands of individual pumps.

It is known to maintain and service pumps in a pumping station at regular intervals in time. However, this may result in pumps that are operating within acceptable parameters being serviced when not necessary, and faulty pumps not being maintained, thus resulting in failure.

It is also known to monitor pump operating parameters, such as the individual pump efficiency (the electrical energy required to move a fixed volume of liquid), to determine whether a pumping station is operating within acceptable parameters, and base pumping station servicing on the monitored parameter. However, each pumping station operates under different conditions, and so the monitored parameters are not comparable, and so there are still problems in efficiently monitoring a large number of pumping stations.

According to a first aspect of the invention, there is provided a system. The system may comprise a reservoir for holding a liquid and a pump arranged to pump the liquid out of the reservoir to a system outlet or into the reservoir from a system inlet. The system may also comprise a pressure sensor arranged between the reservoir and the system outlet or between the system inlet and the reservoir, the pressure sensor configured to measure the discharge pressure of the pump and to generate discharge pressure data; a level sensor configured to detect the level of the liquid in the reservoir and to generate level data; and a power monitor configured to monitor the power consumed by the pump and to generate power data; a volume monitor configured to monitor the volume of liquid pumped by the pump and to generate volume data. In addition, the system may further comprise a controller. The controller may be configured to: receive the power data, the volume data, the discharge pressure data and the level data; process the discharge pressure data to determine a discharge head of the pump; process the level data to determine a static head of the pump; process the discharge head and the static head to determine a total dynamic head of the pump; and process the total dynamic head, the volume data and the power data to determine a normalised pumping station efficiency.

The normalised pumping station efficiency is representative of the amount of electrical energy needed to deliver a fixed volume of liquid to a fixed head. The system is advantageous because the normalised pumping station efficiency is independent of the situation/environment in which the pump is working. Therefore, pumps and pumping stations working under different conditions can be compared. Furthermore, the normalised pumping station efficiency can capture information about the whole pumping station, including, but not limited to, the pumps.

The pumping station efficiency can be determined and compared in situ for a number of pumps or pumping stations, and thus it becomes easy to compare the relative performance of pumping stations. By comparing the performance of pumping stations, maintenance can be more efficiently scheduled, so that only pumping stations in need of servicing are repaired. This reduces resources used, as it provides an automatic and remotely visible function for regular checks on pumps. The normalised pumping station efficiency can also be determined continuously, in real time, which allows for easier and more efficient identification of any problems.

According to a second aspect of the invention, there is provided a system configured for installation in a reservoir for holding liquid. The system may comprise a level sensor configured to be installed in the reservoir and configured to, in use, monitor the liquid level in the reservoir and generate level data based on the monitored liquid level; a power monitor configured to, in use, monitor the power consumed by the pump and generate power data based on the monitored power consumption; a flow monitor configured to be installed in the reservoir and configured to, in use, monitor the volume of liquid pumped by the reservoir and generate volume data based on the monitored volume; and a pressure sensor, the pressure sensor configured to be installed in between the reservoir and a system outlet or between a system inlet and the reservoir and configured to, in use, measure a discharge pressure and generate pressure data based on the measured discharge pressure. The system may also comprise a controller. The controller may be configured to, in use: receive the power data, the volume data, the discharge pressure data and the level data; process the discharge pressure to determine a discharge head of the pump; process the level data to determine a static head of the pump; process the discharge head and the static head to determine a total dynamic head of the pump; and process the total dynamic head, the volume data and the power data to determine a normalised pumping station efficiency.

According to a third aspect of the invention, there is provided a controller. The controller may be configured to implement the system of the first aspect or the second aspect.

According to a fourth aspect of the invention, there is provided a method. The method may comprise the steps of receiving static head data representative of the static head of a reservoir for holding a liquid, the reservoir including a pump arranged to pump the liquid out of the reservoir to a system outlet or into the reservoir from a system inlet. The method may further comprise receiving equivalent head data representative of the resistance head encountered when pumping liquid from the reservoir to the system outlet of from the system inlet to the reservoir. The method may also comprise monitoring the power consumed by the pump and generating power data based on the monitored power; and monitoring the volume of liquid pumped by the pump and generating volume data based on the monitored volume. In addition, the method may comprise processing the discharge head data and the static head data to determine a total dynamic head of the pump; and processing the total dynamic head, the volume data and the power data to determine a normalised pumping station efficiency.

According to a fifth aspect of the invention, there is provided a machine readable medium containing instructions which when executed by a processing apparatus cause that processing apparatus to perform the method of the fourth aspect, or make the processing apparatus function as the system of the first or second aspect, or the controller of the third aspect.

The machine readable medium referred to in any of the above aspects of the invention may be any of the following: a CDROM; a DVD ROM/RAM (including –R/–RW or +R/+RW); a hard drive; a memory (including a USB drive; an SD card; a compact flash card or the like); a transmitted signal (including an Internet download, ftp file transfer of the like); a wire; etc.

Features described in relation to any of the above aspects of the invention may be applied, mutatis mutandis, to any of the other aspects of the invention.

The invention will now be described, by way of example only, with reference to the accompanying drawings, in which.

Figure 1:
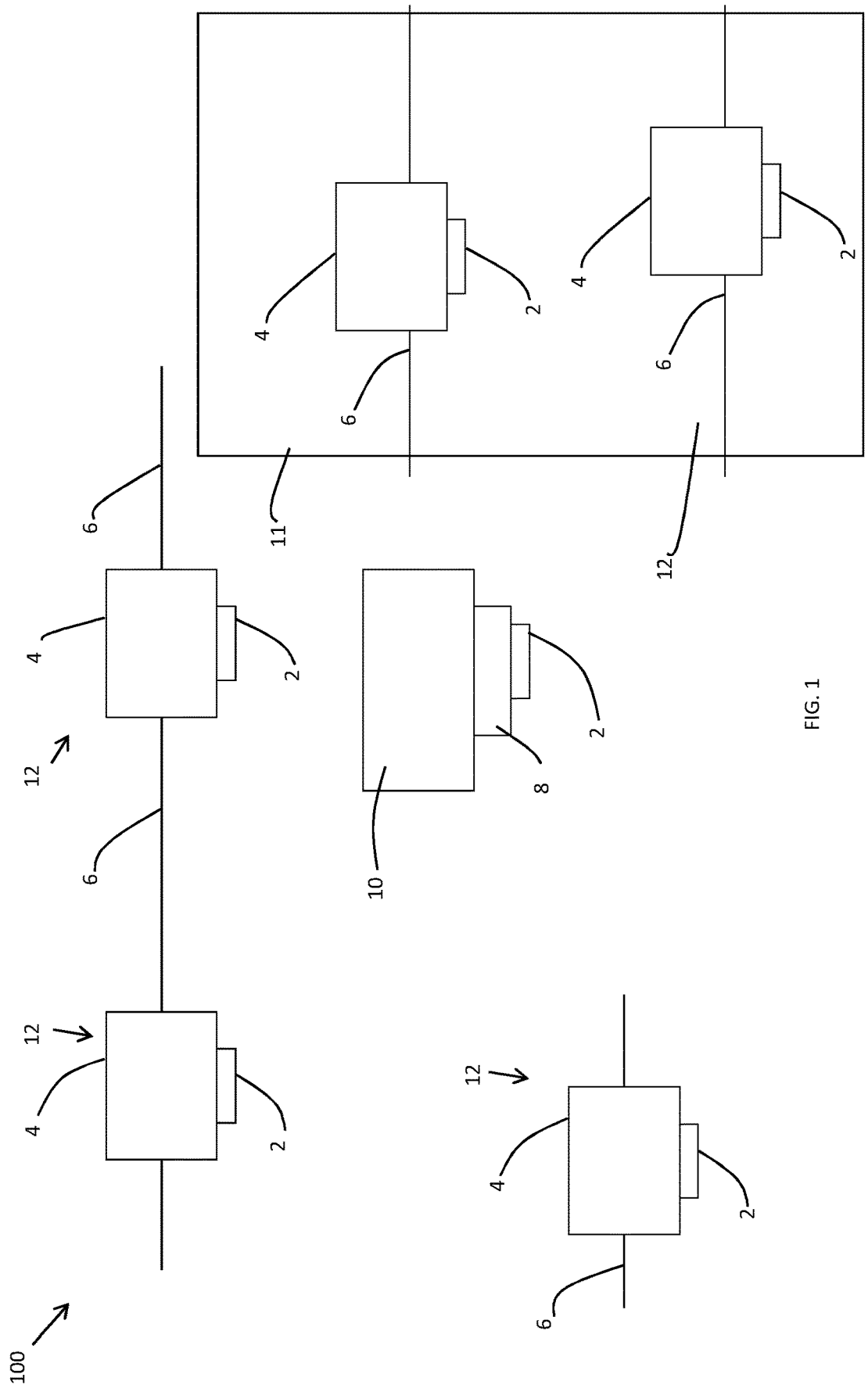
FIG. 1 is a schematic of an example system having a number sumps at different locations.

FIG. 1 shows a schematic of an example system 100 having a number of different sumps 4, operated from a separate location 10. The separate location is in communication with all of the sumps 4 and hence can be referred to as a central location 10. The central location 10 is in communication with the sumps 4 via transmitter/receiver means 2. Each sump 4 is located in a liquid flow line 6. The sumps 4 may be in the same liquid flow line 6, or different liquid flow lines 6. Each sump 4 may constitute a pumping station 12, or a number of sumps may constitute a pumping station 12.

Figure 2:
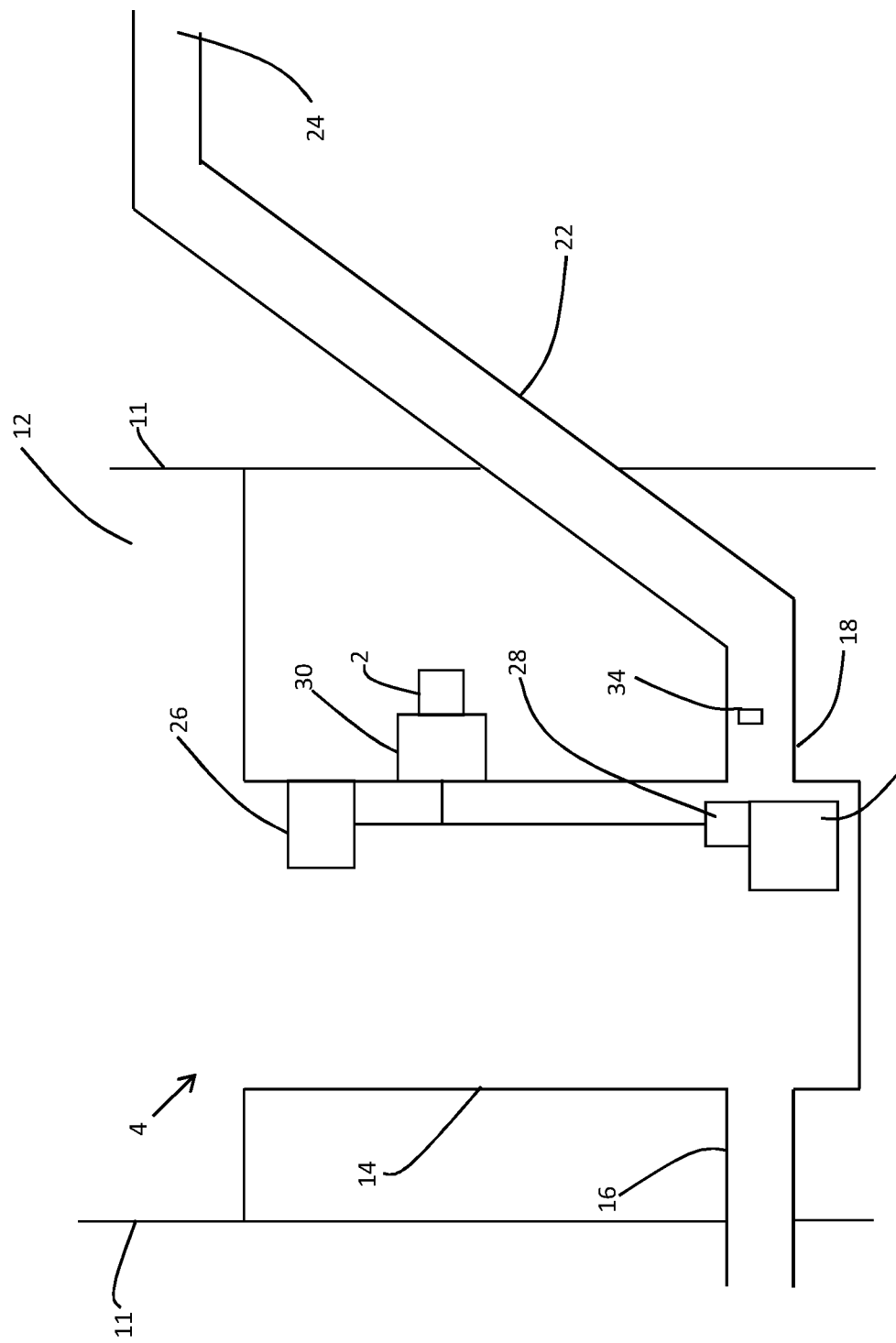
FIG. 2 is a schematic illustration of a typical sump.

FIG. 2 shows a schematic of one example of a sump 4 in a pumping station 12. The pumping station 12 is within a wall or boundary 11. The sump 4 has a reservoir 14 for holding a liquid. The reservoir 14 is fed by a reservoir inlet 16 and drained by a reservoir outlet 18. A pump 20 is provided in the reservoir 14. The pump 20 is controlled to turn on when the liquid reaches a first (ON) liquid level and turn off when the liquid reaches a second (OFF) liquid level.

There may be more than one pump 20 in a reservoir 14. In this case, the different pumps 20 may have different ON levels. The pump 20 that switches on first may be referred to as the duty pump. The pumps 20 may be operated so that the same pump is always used as the duty pump, or that there is some rotation over which pump is used as the duty pump.

Pipework 22 is provided to convey the liquid from the reservoir outlet 18 to a system outlet 24, outside the pumping station 12. This may be a final delivery point, the next pumping station 12, or the highest point to which the pumping station 12 has to pump the liquid. Similarly further pipework (not shown) also provides the liquid from a system inlet, outside the pumping station (not shown) to the reservoir inlet 16. The system inlet may be a source, the previous pumping station or the lowest point from which the liquid has to be pumped.

In the example, shown, the pump 20 is arranged at the reservoir outlet 18 to pump liquid out of the reservoir 14, through the pipework 22 (also known as a rising main), to the system outlet 24. In this example, the ON level is above the OFF level. This will be referred to as pumping down, and is useful in, for example, sewage pumping stations.

In other examples, the pump 20 may be arranged at the reservoir inlet 16 to pump liquid into the reservoir 14. In these examples, the ON level is below the OFF level. This will be referred to as pumping up, and is useful in, for example, fresh water supply systems.

A liquid level sensor 26 is provided to monitor the liquid level in the reservoir 14 and to output level data about the liquid level. A pump condition monitor 28 is also provided to monitor the pump 20. The pump condition monitor 28 can include a power monitor to measure the power consumed by the pump 20 and a volume monitor to monitor the volume of liquid pumped by the pump 20. The pump condition monitor 28 outputs power data relating to the power consumed and volume data relating to the volume pumped.

Any suitable measuring means may be used to measure the liquid level, power and volume. In some examples, the volume can be monitored by measuring changes in liquid level through the level monitoring means 26. In other examples a flow monitor or other suitable means (not shown) may be provided on the output of each pump 20 to measure the total volume pumped.

The liquid level sensor 26 and pump condition monitor 28 are connected to the transmitter/receiver means 2, which can send data on the volume pumped, power consumed and liquid level to the central location 10, from which the pump may be monitored and controlled.

The sump 4 may also include a controller 30, connected to the liquid level sensor 26 and pump monitor 28. The sump controller 30 is arranged to control the pump 20 to turn on and off in the manner described above. The controllers 8, 30 include a memory (not shown) and a processor (not shown).

The power consumption data and volume data can be used to determine the individual pump efficiency of a pump 20, which is the energy consumption required to pump a fixed volume of liquid (for example kilowatt-hours per cubic metre kW-hr/m$^3$). The average individual pump efficiency can then be determined for the whole pumping station 12.

A low average individual pump efficiency for a pumping station 12 indicates that the pumping station is not operating normally, and may require maintenance. However, the individual pump efficiency includes a number of factors in addition to the performance of the pump 20. These factors include:

The depth of the liquid in the reservoir 14. This will vary for different sumps 4 because of how much liquid is present, and because of the liquid levels at which the pump(s) 20 are controlled to switch on and off.

Consider, for example, two identical pumps 20. The first pump 20 is operating in a first reservoir 14 and the second pump 20 is operating in a second reservoir 14. If the first reservoir 14 has a lower liquid level, the first pump 20 will require more power to move a cubic metre of liquid than the second pump 20. This is true, even if the total volume in the sumps 4 is the same, but the liquid levels vary because of different cross-sectional sizes of the reservoirs 14.

The total height that the pump 20 has to move the liquid through from the centre line of the pump 20 to the system outlet 24, or from the system inlet to the reservoir 14.

The "equivalent head" of the pump 20. This is a result of the flow path the pump 20 pumps the liquid through, and results from, for example, the diameter of the piping and the inner surface of the piping.

Consider, for example, the pump 20 of FIG. 2. If the pipe is narrowed, includes a ninety degree bend or is partially blocked by build ups.

The equivalent head may therefore be considered as the resistance encountered when pumping liquid from the reservoir to the system outlet or from the system inlet to the reservoir These factors all contribute to the total dynamic head (TDH) of the sump 4. Other factors, such as mechanical inefficiencies in the pump 20, expansion and contraction of pipes due to temperature, internal build ups, etc. . . . can also contribute to the individual pump efficiency.

For multiple pumps 20 operating in the same reservoir 14, the head of each pump 20 is the same. Therefore, a comparison of the individual pump efficiency for each pump 20 operating in a single reservoir 14 gives an indication of which pump 20 is most in need of maintenance, within the reservoir 14.

However, different reservoirs 14 will have different total dynamic heads. This may be because of, for example, variations in the ON/OFF levels of the pump 20, variations in the size of the reservoir 14, variations in the outlet piping 22 etc. . . .

The difference in total dynamic head means that the average individual pump efficiencies for different pumping stations 12 are not comparable. Therefore, a comparison of the average individual pump efficiency of different pumping stations 12 does not provide an indication of the relative condition of the pumping stations 12.

For example, a first pumping station 12 may have a lower individual pump efficiency than a second pumping station 12. However, the first pumping station 12 may be operating more efficiently, but this is not reflected in the average individual pump efficiency because the first pumping station 12 also has a greater head to overcome. A comparison of the average individual pump efficiency may suggest the first pumping station 12 is faulty, when in reality only the second pumping station 12 is.

Figure 3A:
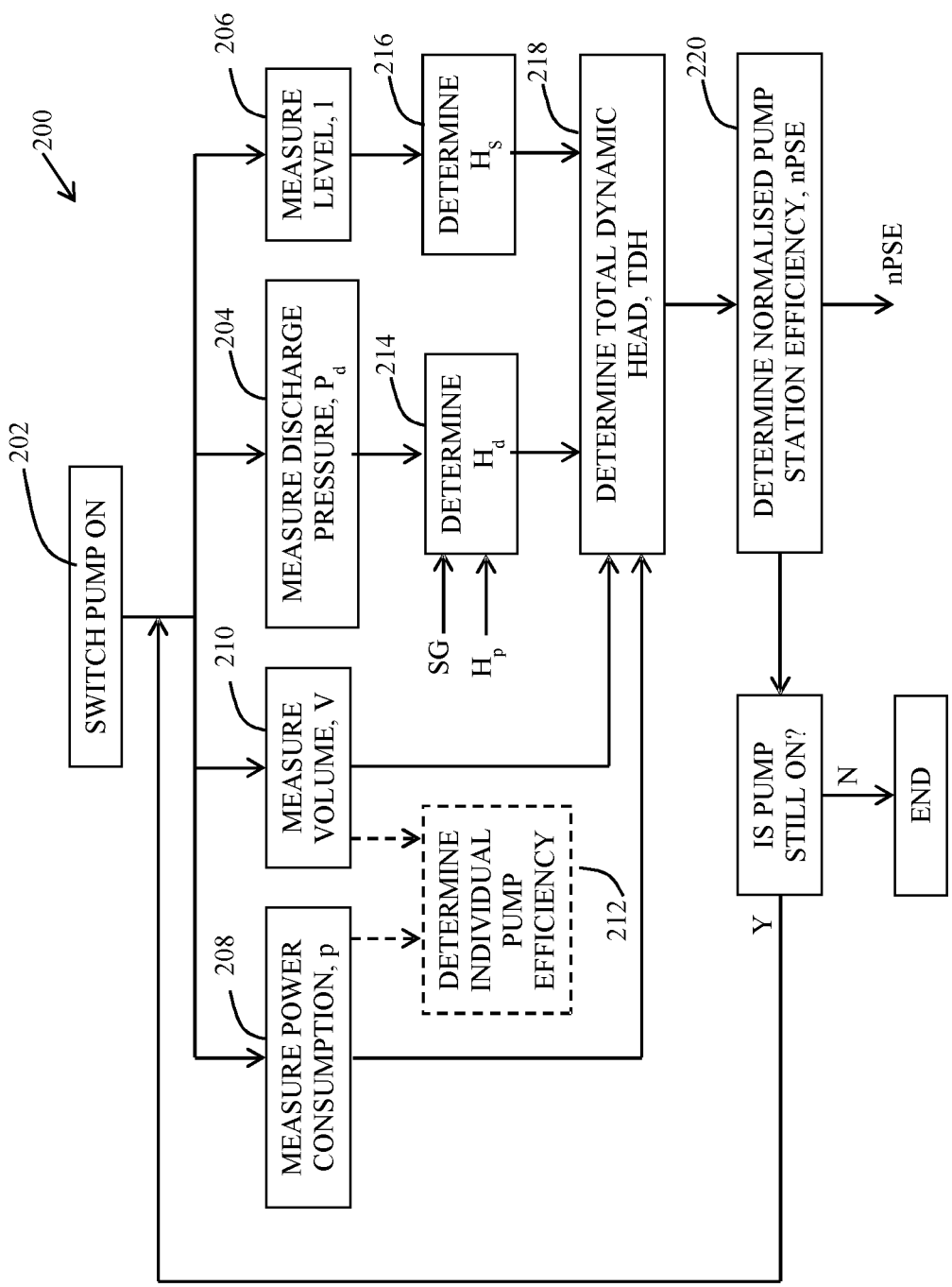
FIG. 3A is a flow chart of a method for dynamically monitoring a pumping station condition according to the invention.

FIG. 3A illustrates a method 200 for monitoring pump condition that allows comparison across different reservoirs 14 or pumping stations 12, since the total dynamic head is taken into account. The method 200 is used to determine the normalised pumping station efficiency. The normalised pumping station efficiency is representative of all pumps 20 operating in a reservoir 14 and normalises the energy consumption per unit volume to the total dynamic head, and is thus independent of the head. In one example, the normalised pumping station efficiency is the amount of electrical energy needed to deliver a cubic meter of liquid to 1 m of total dynamic head.

At a first step 202, the pump 20 is switched on. The pump 20 may be switched on automatically, in response to the level in the reservoir 14 reaching a predetermined ON point or may be switched on manually.

At a second step, 204, the discharge pressure $P_d$ of the pump 20 is measured and the pressure data generated. The pressure may be measured by any suitable pressure sensor or pressure measuring means 34. In pumping down, the pressure sensor should be located within the outlet piping 22 and in pumping up, the pressure sensor should be located within the inlet piping. For ease of access for installation and maintenance of the pressure sensor, the pressure sensor 34 should be located within the pumping station 12.

In pumping down, $P_d$ is a measure of the pressure head of the pump 20. In pumping up, $P_d$ is a measure of the suction lift. The discharge pressure incorporates the total height of which the water is to be moved and the equivalent head of the pump.

At a third step 206, the level of liquid 1 in the reservoir 14 is measured by level sensor 26 and the level data generated.

In a fourth step 208 and a fifth step 210, the power consumption p (typically in kWhr) of the pump 20 and the volume pumped V (typically in cubic metres) by the pump 20 are measured and the volume and power data generated. The volume data is representative of the total volume of liquid pumped since the pump 20 was turned on. The power data is representative of the total power consumed by the pump 20 since the pump 20 was turned on.

The pump 20 will operate over a pumping cycle, between the pumping turning on once the liquid in the reservoir 14 has reached the ON level, and the pump turning off, once the liquid in the reservoir 14 has reached the off level. Each separate pumping cycle of the pump 20 is considered a separate period of operation of the pump 20.

During typical pumping down operation, the flow rate of liquid out of the reservoir 14 may exceed the flow rate of liquid into the reservoir 14 and, in these examples, the liquid level will decrease. However, in some examples, the flow rate of liquid into the reservoir 14 may exceed the flow rate of liquid out of the reservoir 14 and, in these examples, the liquid level will increase, as shown on the left hand side of FIG. 4. In some situations, the liquid level may increase past the ON level. When the liquid level in a reservoir that is operating in pumping down mode is increasing, various methods are known to control the pump 20 and reservoir 14 so that the liquid level decreases. For example, a second pump 20 may be turned on if the liquid level reaches a second ON level.

Similarly, in pumping up operation, the liquid level may decrease in some examples, although in normal operation, the liquid level will increase to the OFF point.

In a first processing step 212, the power consumption and volume are used to determine the individual pump efficiency of the pump 20, which may be output for further uses.

In a second processing step 214, the discharge pressure $P_d$ measured at a time t ($P_{d,t}$), is converted to a discharge head at time t ($H_{d,t}$). The discharge head of the pump 20 is representative of the vertical distance the pump 20 has to move liquid through and the friction encountered by the liquid as it is moved by the pump 20.

To calculate the discharge head, the equivalent head at the time t ($H_{e,t}$) is first determined based on the discharge pressure. The pressure measurement $P_{d,t}$ can be converted to the head $H_{e,t}$ according to:

$$H_{e,t} = P_{d,t} c \qquad (1a)$$

For a head value in feet, the pressure is measured in psi and c=2.31, for a head value in metres, the pressure is measured in kPa and c=0.1.

Where the liquid being pumped is not water, the specific gravity SG of the liquid also may be taken into account. This can be achieved by modifying c to c/SG.

A further factor is also applied to the equivalent head, to account for the head caused by the vertical difference ($H_p$) between the pump 20 centre-line and the pressure sensing means 34 ($H_p$ is positive when the pressure sensing means 34 is above the pump 20). This final correction gives the discharge head:

$$H_{d,t} = P_{d,t}c + H_p \qquad (1b)$$

$H_p$ may be determined by user inputs, preprogrammed at system installation, or be derived from position sensors on the pump 20 and/or pressure sensing means 34.

In a third processing step 216, the static head ($H_s$) of the pump at time t ($H_{s,t}$) is determined. The static head is the difference between the centre line of the pump 20 and the measured liquid level in the reservoir 14. Therefore, the static head varies as the reservoir 14 is filled or emptied.

The level of the pump 20 can be pre-programmed, and stored in memory, or determined based on a detector at the pump 20.

In a subsequent processing step 218, the total dynamic head at time t ($TDH_t$) is calculated based on the difference between $H_{s,t}$ and $H_{d,t}$:

$$TDH_t = H_{d,t} - H_{s,t} \qquad (2)$$

In a final process step 220, the normalised pumping station efficiency at time t ($nPSE_t$) is determined and output:

$$nPSE_t = p/V/TDH_t \qquad (3)$$

The process is then repeated at a next time (t+1), to determine $nPSE_{t+1}$. The process is repeated until the liquid level reaches the OFF point. Since the process is repeated continually over the pumping cycle, it may be considered dynamic. The normalised pumping station efficiency calculated at a given time can also be considered instantaneous.

It will be appreciated that instead of equation 3, the pumping station efficiency at time t could be determined by dividing the individual pump efficiency at time t by $TDH_t$. Also, the step 212 of determining the individual pump efficiency is optional and may be omitted. The method may be performed in any suitable order.

Where there are multiple pumps 20 operating in a pumping station 12, the normalised pumping station efficiency can be determined for the whole pumping station 12 in a number of ways:

The normalised pumping station efficiency may be determined for only the duty pump. If the duty pump is rotated, calculating the normalised pumping station efficiency for only the duty pump will take into account all pumps 20 operating in the station. In some examples, the normalised pumping station efficiency may only be determined for periods where only the duty pump is operating.

The normalised pumping station efficiency may be determined for each pump 20 and then an average taken. This would require the ability to monitor the separate volume pumped by each pump 20, and not just the volume pumped out of the reservoir 14.

The normalised pumping efficiency may be calculated based on data determined from the reservoir as a whole (for example, total volume pumped, total power consumed etc. . . . ), for a pumping cycle lasting from when the first pump is turned until when the last pump is turned off.

The individual pump efficiency may be calculated for each pump, and the normalised pumping station efficiency determined based on the average of the individual pump efficiencies and the total dynamic head, which is constant regardless of the number of pumps. Again, this may be for a pumping cycle lasting from when the first pump is turned until when the last pump is turned off It will be appreciated that the volume data and power data do not have to be representative of the volume pumped and power consumed since the pump was turned on. Instead, they may be an instantaneous volume and power consumption. The power and volume for use in equation 3 may be derived by integration of the instantaneous power and volume either between the current time and the time the pumped was turned on, or in a small time window about the current time.

In addition, the normalised pumping station efficiency may be calculated for the complete pumping cycle to provide a single parameter representative of the whole pumping cycle.

Figure 3B:
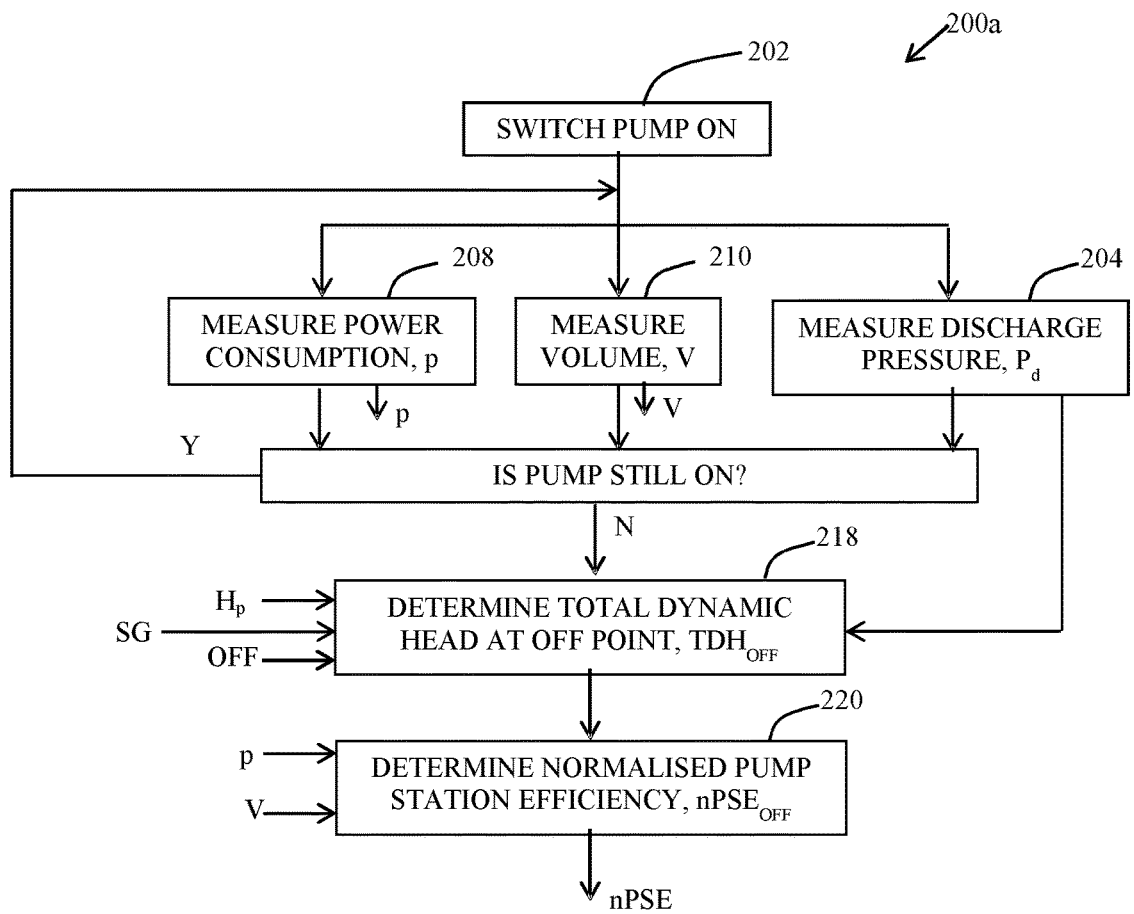
FIG. 3B is a flow chart of a static method for monitoring a pumping station according to the invention

FIG. 3B shows an alternative method 200a of calculating a normalised pumping station efficiency.

In a similar fashion to the method 200 of FIG. 3A, the power, volume and pressure are measured over the course of a pumping cycle. However, in this example, the total dynamic head is not calculated until the pumping cycle has finished.

At step 218 of FIG. 3B, the total dynamic head is calculated for the time when the pump turns off. As in the method of FIG. 3A, the total dynamic head is calculated by determining the discharge head and the static head.

In the method 200a of FIG. 3B, the last discharge pressure reading before the pump is turned off ($P_{d,off}$) is used to calculate the discharge head at the point the pump is turned off ($H_{d,off}$).

$$H_{d,off} = P_{d,off}c + H_p \qquad (4)$$

Where c and $H_p$ are the same as in the method 200 of FIG. 3A.

The total dynamic head at the off point ($TDH_{off}$) is then calculated at step 218 by:

$$TDH_{OFF} = H_{d,t} - H_{s,t} \qquad (5)$$

Since the pump is controlled to turn off at a set OFF point, the static head at the off point is fixed, and can thus be retrieved from memory, or calculated from the OFF point. However, in some example, it may still be determined based on the measured level.

At a final processing step, the normalised pump station efficiency at the off point ($nPSE_{OFF}$) is then calculated by:

$$nPSE_{off} = p/V/TDH_{off} \qquad (6)$$

Where p is the total power consumed and V is the total volume consumed.

The $nPSE_{off}$ is a single measurement based on a fixed OFF point, and can thus be considered static. The static normalised pumping station efficiency can be determined for whole pumping station 12 in a similar fashion to the dynamic normalised pumping station efficiency.

When there are multiple pumps 20 in a pumping station 12, the $nSPE_{off}$ may be determined for the duty pump only, by only measuring when the duty pump 20 is the only pump on. Alternatively, the $nSPE_{off}$ may be determined for each pump 20, or for the pumping station 12 as a whole.

An alternative method of calculating the static normalised pump efficiency requires a measurement of the discharge pressure to be taken when the pump is not pumping and a measurement of the discharge pressure when the pump has been turned on.

The discharge pressure when the pump is not pumping ($P_{d,np}$) corresponds to the static head ($H_s$).

The discharge pressure measured when the pump is turned on ($P_{d,ON}$) is representative of the sum of the static head ($H_s$) and the equivalent head ($H_e$). Using the above formulae, the measurements of $P_{d,np}$ and $P_{d,off}$ can be used to determine a static normalised pumping station efficiency.

Figure 4:
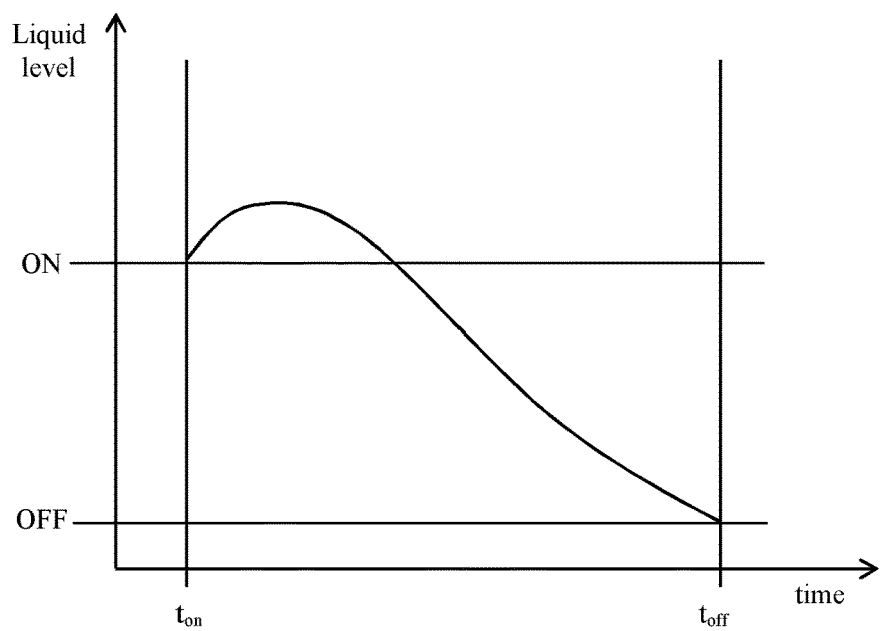
FIG. 4 shows the variation in the liquid level over an example pumping down cycle.
Figure 5A:
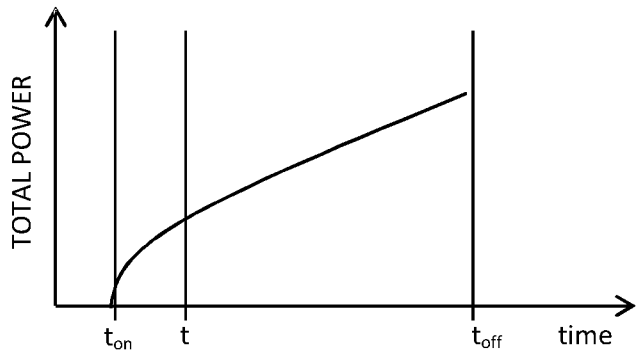
FIG. 5A shows the variation in power used by a pump over an example pumping down cycle.
Figure 5B:
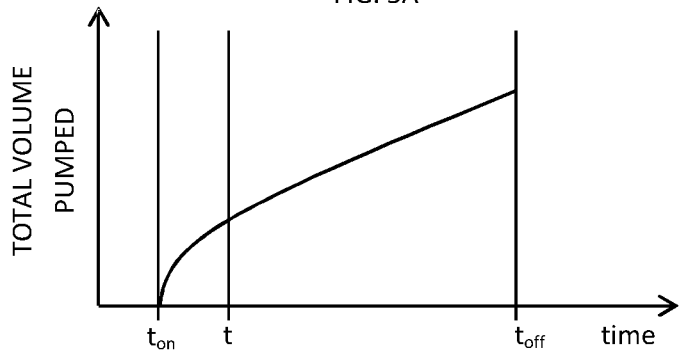
FIG. 5B shows the total volume pumped by a pump over the example pumping down cycle of FIG. 4A.
Figure 5C:
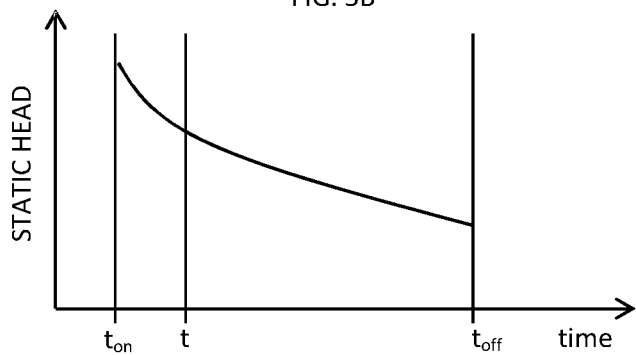
FIG. 5C shows the static head pump over the example pumping down cycle of FIG. 4A.
Figure 5D:
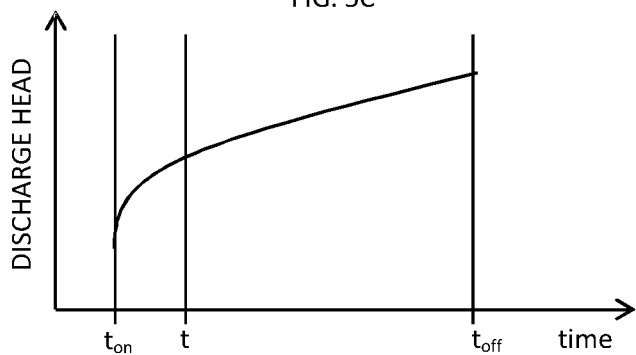
FIG. 5D shows the discharge head over the example pumping down cycle of FIG. 4A.

FIG. 5A shows an example of in the total power consumed by a pump 20 over a pumping cycle (this may be a different cycle to the one shown in FIG. 4). The pump 20 switches on at $t_{on}$ and off at $t_{off}$. FIGS. 5B, 5C and 5D show the total volume pumped over the same pumping cycle, the static head at any given time over the same pumping cycle and the discharge head at any given time over the same pumping cycle respectively.

In one example, the method 200, 200a is performed entirely at the central location 10. Each sump 4 comprises a controller 30 that is responsible for receiving and forwarding level data, volume data, power data, and pressure data to a controller 8 at the central location 10, via the transmitter/receiver 2.

The central controller 8 comprises a processor and a memory (not shown) the memory includes instructions for carrying out the method 200. The instructions cause the processor to take the received measurements, and for each pump 20, determine the $nPSE_{ps}$ according to the method 200.

The controller 8 is also arranged so that the determined values of nPSE are stored. The nPSE values are stored with an identifier of the pumping station 12 associated with each value.

Monitoring of the nPSE can be used to determine when pumping stations 12 require maintenance. For example, where the nPSE of a particular pump 20 is much lower than the other pumping stations 12, this may be indicative of a faulty pump 20. This may be determined by monitoring whether the nPSE falls more than a threshold value below the average nPSE over all pumping stations 12 or the expected nPSE.

The controller 8 at the central location 10 may also optionally include means for displaying the nPSE and/or providing indicators of when a pumping station 12 requires maintenance.

It will be appreciated that in some embodiments, the method 200, 200a may be at least partially performed locally at the sump 4. The controller 30 at the sump 4 may be arranged to determine nPSE, or the average, or any of the intermediate values (such as the different heads or the individual pump efficiency) and provide these to the central location 10, rather than the raw data. The local controller 30 may also be arranged to display the nPSE values and/or the individual pump efficiency and to receive any indication that maintenance is required from the central controller 8.

In some examples, each local controller 30 may receive information about nPSE values for other pumps 20. This may be in the form of raw nPSE values, or thresholds below which a pump 20 is considered faulty. This allows the local controller 30 to make the determination as to when maintenance of a pump 20 is required. This indication may be provided to the central location 10.

In the above example, nPSE is used to determine maintenance for a whole pumping station. It will be appreciated that the nPSE for each pump may be used instead, and indeed this will occur where only one pump 20 is operating in a pumping station 12.

It will also be appreciated that any of the inputs required to determine the normalised pumping station efficiency (such as, $P_d$, p, V, l, $H_s$, $H_e$, $H_p$, TDH) may be based on user inputs, that have been estimated or determined based on known models.

FIGS. 1 and 2 are for illustrative purposes only, and are not drawn to scale. Similarly, the data shown in FIGS. 4 and 5 is also for illustrative purposes only, and is not to scale. In FIGS. 1, 2, 4 and 5 certain features or parts of the drawing may be enlarged to better illustrate what is being described.

The above examples have been described in terms of reservoirs and sumps. However, it will be appreciated that these terms may be used to refer to any suitable containers for holding liquids in pumping stations and the like.

The invention claimed is:

1. A system comprising:
a level sensor configured to be installed in a reservoir for holding a liquid, wherein the level sensor is configured to monitor a liquid level in the reservoir and to generate level data based on the monitored liquid level;
a power monitor configured to monitor power consumed by a pump associated with the reservoir and to generate power data based on the monitored power consumption;
a volume monitor configured to monitor a volume of liquid pumped by the pump and generate volume data based no the monitored volume;
a pressure sensor configured to measure a discharge pressure of the pump and generate discharge pressure data based on the measured discharge pressure, and
a controller configured to:
receive the power data, the volume data, the discharge pressure data and the level data;
process the discharge pressure data to determine a discharge head of the pump;
process the level data to determine a static head of the pump;
process the discharge head and the static head to determine a total dynamic head of the pump; and
process the total dynamic head, the volume data and the power data to determine a normalised efficiency.

2. The system of claim 1, wherein the controller is configured to:
process the discharge pressure data to determine an equivalent head, the equivalent head representative of friction encountered by the liquid as it is moved by the pump; and
process the equivalent head of the pump to determine the discharge head of the pump.

3. The system of claim 2, wherein the controller is configured to:
receive vertical displacement data, representative of a vertical displacement between the pressure sensor and the pump; and
process the vertical displacement data and the equivalent head of the pump to determine the discharge head of the pump.

4. The system of claim 2, wherein the controller is configured to:
receive specific gravity data, representative of the specific gravity of the liquid being pumped; and
process the discharge pressure data and the specific gravity data to determine the equivalent head.

5. The system of claim 1, wherein the controller is further configured to:
  process the volume data and the power data to determine an individual pump efficiency of the pump, the individual pump efficiency representing an amount of electrical energy required to pump a fixed volume of water.

6. The system of claim 1, wherein the pump is arranged to pump liquid out of the reservoir to a system inlet outlet or into the reservoir from a system.

7. The system of claim 6, wherein the pump is arranged to operate over a pumping cycle, the pumping cycle corresponding to a period between a level of the liquid in the reservoir reaching a set point at which the pump turns on, and a set point at which the pump turns off, wherein the controller is configured to:
  receive power data, volume data, discharge pressure data and level date measured at a first time in the pumping cycle, wherein:
    the power data measured at the first time in the pumping cycle corresponds to the total power consumed between a start of the pumping cycle and the first time;
    the volume data measured at the first time in the pumping cycle corresponds to the total volume pumped between the start of the pumping cycle and the first time; and
    the discharge pressure data and level data measured at the first time in the pumping cycle correspond to the discharge pressure and level measured at the first time; and
  determine a normalised efficiency at the first time.

8. The system of claim 6, comprising a first pump and a second pump, wherein the controller is further configured to:
  determine a normalised efficiency based on power consumed by the first pump and the second pump, a volume of liquid pumped by the first pump and the second pump, and the total dynamic head.

9. The system of claim 8, wherein the power monitor is arranged to monitor a total power consumed by the first pump and the second pump together, and the volume monitor is arranged to monitor a total volume of liquid pumped by the first pump and the second pump together.

10. The system of claim 8, comprising:
  a first power monitor configured to monitor the power consumed by the first pump;
  a first volume monitor configured to monitor the volume of liquid pumped by the first pump;
  a second power monitor configured to monitor the power consumed by the second pump; and
  a second volume monitor configured to monitor the volume of liquid pumped by the second pump;
    wherein the controller is configured to:
      determine a pump efficiency of the first pump and a pump efficiency of the second pump; and
      process the pump efficiency of the first pump and the second pump to determine the normalised efficiency.

11. The system of claim 1, wherein the volume monitor is configured to receive level data from the level sensor, and determine the volume of liquid pumped based on a change in the level data.

12. The system of claim 1, wherein the volume monitor comprises a flow monitor configured to be installed in the reservoir.

13. The System of claim 1, wherein the controller is configured to:
  determine a normalised efficiency for each of a plurality of reservoirs, each reservoir having one or more pumps operating therein;
  process the normalised efficiency for each reservoir; and
  determine a maintenance schedule based on the normalised efficiencies, the maintenance schedule indicating the reservoir where the pumps are most in need of maintenance.

14. The system of claim 1, wherein the controller comprises processing circuitry arranged to be located in a region of the pump, or located at a separate location or distributed between the pump and the separate location.

15. A method comprising the steps of:
  receiving static head data representative of a static head of a reservoir for holding a liquid, the reservoir including a pump arranged to pump the liquid out of the reservoir to a system outlet or into the reservoir from a system inlet;
  receiving equivalent head data representative of the resistance encountered when pumping the liquid from the reservoir to the system outlet or from the system inlet to the reservoir;
  monitoring power consumed by the pump and generating power data based on the monitored power;
  monitoring a volume of liquid pumped by the pump and generating volume data based on the monitored volume;
  processing the static head data and the equivalent head data to determine a total dynamic head of the pump; and
  processing the total dynamic head, the volume data and the power data to determine a normalised efficiency.

16. The method of claim 15, comprising:
  measuring a discharge pressure of the pump between the reservoir and the system outlet or between the system inlet and the reservoir;
  generating the equivalent head data based on the measured discharge pressure;
  processing the equivalent head data to determine a discharge head of the pump; and
  processing the discharge head and the static head to determine the total dynamic head.

17. The method of claim 16, comprising:
  detecting a level of the liquid in the reservoir and generating level data based on the detected level; and
  processing the level data to determine the static head data.

18. The method of claim 17, wherein the pump operates over a pumping cycle, the pumping cycle corresponding to a period between the level of the liquid in the reservoir reaching a set point at which the pump turns on, and a set point at which the pump turns off, the method further comprising:
  measuring power data, volume data, discharge pressure data and level data at to a first time in the pumping cycle, wherein:
    the power data measured at the first time in the pumping cycle corresponds to the total power consumed between a start of the pumping cycle and the first time;
    the volume data measured at the first time in the pumping cycle corresponds to the total volume pumped between the start of the pumping cycle and the first time; and
    the discharge pressure data and level data measured at the first time in the pumping cycle correspond to the discharge pressure and level measured at the first time; and determining a normalised efficiency for the first time.

19. The method of claim 15, wherein the pump operates over a pumping cycle, the pumping cycle corresponding to a period between a level of the liquid in the reservoir reaching a set point at which the pump turns on, and a set point at which the pump turns off, wherein:
- the equivalent head data and static head data are representative of the equivalent head and static head at a time at which the pump turns off;
- the volume data is representative of the volume pumped over the whole pumping cycle; and
- the power data is representative of the power consumed over the whole pumping cycle.

20. A non-transitory machine readable medium containing instructions which when executed by a processing apparatus cause that processing apparatus to perform the method of claim 15.

* * * * *